United States Patent
Hwang et al.

(10) Patent No.: US 6,434,188 B1
(45) Date of Patent: *Aug. 13, 2002

(54) DIFFERENTIAL ENCODING ARRANGEMENT FOR A DISCRETE MULTI-TONE TRANSMISSION SYSTEM

(75) Inventors: Chien-Meen Hwang, San Jose; Hungming Chang, Cupertino; Maged F. Barsoum, Sunnyvale; Muoi V. Huynh; Eugen Gershon, both of San Jose; Fred Berkowitz, Palo Alto; Bin Guo, Fremont, all of CA (US)

(73) Assignee: Legerity, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/286,989

(22) Filed: Apr. 7, 1999

(51) Int. Cl.$^7$ ................................................ H04B 1/38
(52) U.S. Cl. ...................................... 375/222; 375/261
(58) Field of Search ................................ 375/222, 260, 375/261; 370/209

(56) References Cited

U.S. PATENT DOCUMENTS

| | | | | |
|---|---|---|---|---|
| 5,166,924 A | * | 11/1992 | Moose | 370/289 |
| 5,774,500 A | * | 6/1998 | Zogakis et al. | 375/261 |
| 6,192,026 B1 | * | 2/2001 | Pollack et al. | 370/203 |
| 6,252,912 B1 | * | 6/2001 | Salinger | 375/278 |

* cited by examiner

*Primary Examiner*—Don N. Vo
(74) *Attorney, Agent, or Firm*—McDermott, Will & Emery

(57) ABSTRACT

A random-access local network having multiple nodes provides data communication across residential wiring such as telephone line as a network medium, where each node accesses the network medium using discrete multi-tone (DMT) modulated symbols. The effects of amplitude and phase distortion of transmitted DMT symbols are overcome, without the necessity of complex equalizers, by differentially encoding data prior to transmission, and recovering the transmitted data by comparing phase differentials between consecutive symbol tones. Each transmitted symbol is composed of a plurality of tone signals, each tone signal modulated according to a constellation point in a complex domain. A transmitter modulates data, such as a bit-pair, to a new constellation point based on the value of the bit-pair and a prior position of a consecutively-preceding constellation point, such that the data is represented by the difference in positions between the consecutively-preceding constellation point and the new constellation point. The constellation points are then used to modulate a selected one of the tone signals. Although a receiver detecting the modulated tone signal may recover the transmitted constellation points at different absolute positions due to distortion on he network medium, the relative difference between the consecutively-preceding constellation point and the new constellation point is preserved, enabling the receiver to recover the transmitted data based on the relative difference in positions of the consecutive constellation points. Hence, entire bit stream can reliably transmitted using position changes between consecutive constellation points.

18 Claims, 3 Drawing Sheets

DIFFERENTIAL ENCODING ARRANGEMENT FOR A DISCRETE MULTI-TONE TRANSMISSION SYSTEM

BACKGROUND OF THE INVENTION

1. Field of the Invention

The present invention relates to a transmission of data in a discrete multi-tone (DMT) data communications network, particularly a transmission and reception of data in a network for communications between multiple devices coupled to existing wiring, for example twisted pair telephone wiring in the user's residence.

2. Description of the Related Art

Modem society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Conventional local area network architectures use media access controllers operating according to half-duplex or full-duplex Ethernet (ANSI/IEEE standard 802.3) protocol using a prescribed network medium, such as 10 BASE-T.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL related service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line, either directly or through a frequency combiner/splitter, which often is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The most common form of the FDM data transport for DSL services utilizes discrete multi-tone (DMT) technology. A DMT signal is basically the sum of N independently QAM modulated signals, each carried over a distinct carrier frequency channel. The frequency separation of each carrier is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform.

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line. There is no way to use the units for multi-point communications. Also, the existing ADSL modems tend to be quite complex, and therefore are too expensive for in-home communications between multiple data devices of one customer.

A need therefore still exists for techniques to adapt DMT type DSL communications for use over existing in-home wiring. The adaptations should enable multi-point communications. Also, many of the problems overcome by complex methodologies in ADSL communications need corresponding simpler, more cost effective solutions for in-home networking.

For example, decoding of DMT data signals requires accurate timing between the transmitter and the receiver. In existing ADSL communications, one of the tone frequency channels is used as a pilot tone channel. DMT demodulation and decoding for all other channels is based on recovery of timing information from the pilot tone. For example, FIG. 1 illustrates a conventional arrangement for modulating a bit-pair to be transmitted on a given tone As shown in FIG. 1, the bit pair is modulated (i.e., mapped) into a complex number, referred to as a constellation point; hence, the bit-pair 00 is mapped to constellation point 1+j, 01 is mapped to −1+j, 11 is mapped to −1−j, and 10 is mapped to 1−j, where j is the square root of −1. The constellation point represents the amplitude and phase of the corresponding QAM-modulated tone. As shown in FIG. 1, the shaded point 5a represents the bit pair 00 transmitted onto a network mediums whereas the shaded point 5b represents the bit pair 00 having encountered attenuation and phase distortion 6 due to transmission 7 on the network medium. Hence, the receiver must perform complex equalization 9 based on the pilot tone channel to generate an equalized constellation point 5c that corresponds to the the original constellation point 5a.

Existing systems suffer the disadvantage of requiring a pilot tone channel dedicated to providing complex attenuation information for receiver equalizers in networked systems. The necessity of a pilot tone wastes at least one tone that could otherwise be used for transmission of data. Also, coordination of reception of all of the other tones to the timing from the one pilot tone is extremely complex. Moreover, the necessity of an equalizer in the receiver system results in a high-cost and high-complexity receiver system, especially since the equalizer may need to retune itself to different coefficient settings for communication with different network nodes.

In a multi-point, random access communication application, the equalization problem becomes particularly acute. Unlike the point-to-point implementations where communications are always on-going and enable virtually continuous synchronization between transmitter and receiver, the random access type devices only send when they have data to send. As a result, the receiver needs to either be able to identify the transmitting node and quickly adjust its equalizer coefficient settings accordingly on a per-packet basis, or the receiver must use multiple equalizers, each tuned for reception of data from a corresponding network node, to simultaneously equalize the received signal and then determine the optimally-tuned signal. In addition, use of a long training sequence attached on each packet in a packet-switched network (e.g., Ethernet) is impractical due to the added overhead. Also, a transmitter clock frequency my be slightly different than a receiver clock frequency; hence, the transmitted constellation points may encounter phase rotation at the-receiver end, requiring either synchronization between the transmitter and receiver, or frequent update of the equalizer to compensate for the rotation.

Hence, the equalization problem in a multi-point, random access communication application results in a substantially complex receiver system having sophisticated (and hence expensive) equalizers.

A need therefore exists for a simpler form of transmitting and recovering data, particularly one that is readily adaptable to a multi-point network using existing wiring such as twisted pair telephone wiring on a user's premises.

SUMMARY OF THE INVENTION

The present invention overcomes the noted problems involved in data networking and satisfies the above stated needs by providing a coding technique, at the physical layer, for use in a multi-point DMT communication system, by generating a constellation tint for a tone based on a relative position of a preceding constellation point and a value of a group of bits. In particular, a group of bits are encoded into a constellation point based on the relative position of the preceding constellation point and the value of the group of bits. Since each constellation point output from a given transmitter to a given receiver will have the substantially the same attenuation and phase distortion over a relatively short time period (e.g., within a few milliseconds or shorter), the phase differential between the preceding constellation point and the generated constellation point will remain substantially the same from the transmitter to the receiver. Hence, a receiver can reliably determine the vale of the group of bits based on the phase difference between the preceding constellation point and the generated constellation point, regardless of the distortion conditions encountered on the network media during transmission.

Thus one aspect of the present invention relates to a method for encoding data for transmission on a shared network medium in a random-access multipoint network. The method includes transmitting on the shared network medium a tone modulated based on a corresponding first constellation point having a first position in a complex planes encoding a group of bits into a second constellation point having a second position in the complex plane based on the first position and a value of the group of bits, and modulating and transmitting the tone on the shared network medium based on the second constellation point consecutively following the first constellation point. Transmission of the tone based on the second constellation point consecutively following the first constellation point ensures that a receiver, upon demodulation of the transmitted tone, recovers the second constellation point consecutively following the first constellation point, enabling the receiver to recover the group of bits based on the difference in the first and second positions of the respective constellation points, regardless of any phase distortion that may be encountered on the channel medium.

Another aspect of the present invention provides a method of communicating data over in-house wiring. The method includes transmitting from a transmitter onto the in-house wiring a first symbol as a plurality of discrete multiple tones, one of said tones modulated according to a first constellation point having a first position in a complex plane, detecting in a receiver the first constellation point at a first distorted position that is different then the first position in the complex plane, encoding in the transmitter a group of bits into a second constellation point having a second position in the complex plane based on the first position and value of the group of bits, transmitting a second symbol onto the in-house wiring by modulating the one tone according to the second constellation point consecutively following the first constellation point, detecting in the receiver a second distorted position of the second constellation point in the complex plane, and recovering the group of bits in the receiver by comparing the second distorted position of the second constellation point with the first distorted position.

Still another aspect of the present invention provides a A discrete multi-tone transmitter for transmitting digital data on an analog line. The transmitter includes a differential encoder for encoding the digital data into a new constellation point having a new position in a complex plane based on a value of the digital data and a consecutively preceding constellation point having a corresponding preceding position, and a converter for converting the consecutively preceding constellation point and the new constellation point into a time domain-modulated tone signal for transmission on the digital line.

Yet another aspect of the present invention provides a random access multipoint network for transmission of data. The network includes a shared network medium and a plurality of network nodes. Each network node includes a transmitter having a differential encoder for encoding the data into a new constellation point having a new position in a complex plane based on a value of the data and a consecutively preceding constellation point having a corresponding preceding position, and a receiver. The receiver is configured for detecting a first constellation point having a first position in a complex plane and a second constellation point, consecutively following the first constellation point and having a second position in the complex plane, from a modulated tone having encountered amplitude and/or phase distortion on the shared network medium. The receiver recovers the data transmitted by the modulated tone based on the second position relative to the first position.

Additional advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numerals represent like elements throughout and wherein.

BEST MODE FOR CARRYING OUT THE INVENTION

Figure 2:
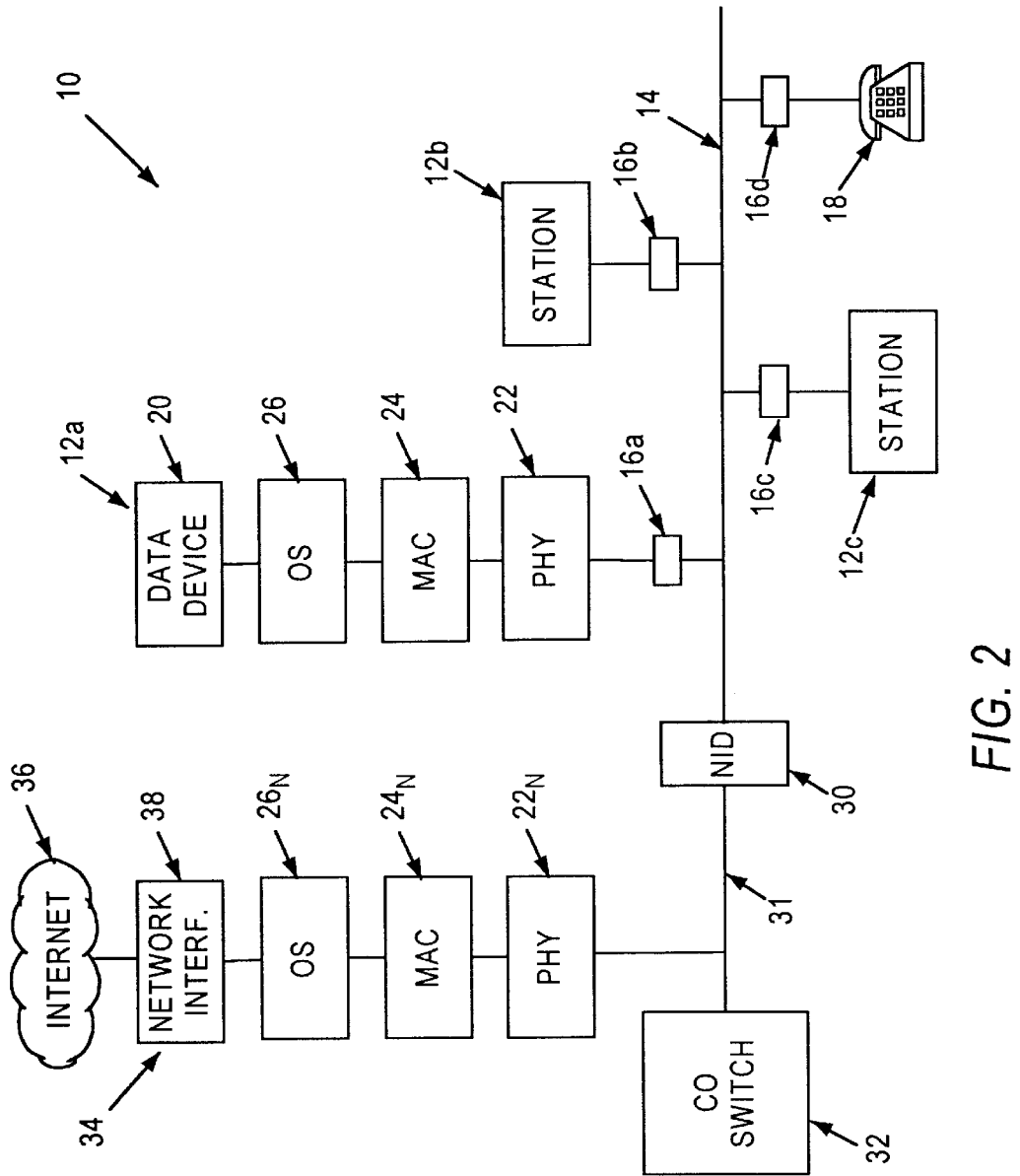
FIG. 2 is a block diagram illustrating a local area network deployed over residential twisted pair wiring.

FIG. 2 is a diagram of a local area network 10 implemented in a home or similar customer premises environment using network media 14 according to an embodiment of the present invention. The network may use a variety of different physical lines for the network media 14, such as coaxial cable, multi-pair cables, power lines, optical fiber or RF wireless communication links. In the preferred embodiment, the media 14 comprises twisted pair telephone wiring, commonly available in the home or office. As shown in FIG. 2, the network 10 includes network stations 12a, 12b and 12c that are connected to a telephone line (twisted pair) wiring 14, via RJ-11 phone jacks 16a, 16b and 16c respectively. A telephone 18 connected to the RJ-11 phone jack 16d may continue to make phone calls while one or more of the stations 12 are communicating data.

As illustrated in more detail with respect to exemplary first station 12a in FIG. 2, each home network station 12 comprises a data device 20, for example a personal computer, printer, or intelligent consumer electronics device. Each station 12 also includes a physical layer (PHY) transceiver 22, a media access (MAC) layer 24, and an operating system (OS) layer 26 that performs higher layer functions according to the OSI reference model. In the inventive network, the PHY transceiver utilizes digital signal processing techniques to implement discrete multi-tone transport of digital data over the telephone wiring 14.

The stations 12 communicate by transmitting network data modulated into the analog network signals in accord with the invention. In particular, the physical layer transmitter transmits data as discrete multi-tone (DMT) symbols carrying the actual digital communication data. The physical layer receiver receives and processes these signals and demodulates the DMT symbols to recover the data, described in further detail below.

The network 10 is envisioned as a home network, although it will be apparent that the network may be used in a variety of other customer locations. In many such installations, the network 10 will provide random access to the local area network media 14 for data communications between the stations 12 within the customer premises. However, it is within the scope of the invention to utilize the DMT-based data communications to access external networks. Normally, the customer premises wiring 14 connects through a network interface device (NID) 30 to a subscriber's telephone line 31. The line 31, in turn connects to a central office (CO) switch 32 of the public switched telephone network. The switch 32 provides normal voice-grade telephone services, for example for communications using the telephone 18.

However, the line 31 may also transport DMT signals at appropriate frequencies for access to another network. In such an installation, the telephone network operator or another service provider would have a digital terminal unit 34 coupled to the subscriber's telephone line 31. The device 34 provides access to an external wide area data network, for example using ATM or SMDS to gain access to the public packet switched data network 36 commonly referred to as the Internet. The digital terminal unit 34 includes a physical layer (PHY) transceiver $22_N$, a media access (MAC) layer $24_N$, and an operating system (OS) layer $26_N$ that perform functions similar to the transceiver 22, the MAC 24 and the OS 26 in each of the home stations 12, respectively In the terminal 34, however, the data device takes the form of a network interface 38 for providing the appropriate interface to the physical transport media of the higher level data network 36.

The DMT transmitters and receivers in the DMT PIY transceivers 22 utilize digital signal processors, to generate and/or demodulate complex analog waveforms carrying bits of data modulated onto individual tones within the available bandwidth. For example, the transmitter generates a DMT symbol by supplying a number of samples through a digital to analog converter to produce the analog waveform of the symbol, having the mathematical properties necessary to represent the data carried by the symbol. Similarly, the receiver samples a received waveform and processes the time-domain values of the samples. This processing derives frequency-domain data, enabling the receiver to then detect the data bits transported on each tone contained within the symbol.

It should be noted that all PHY transceivers 22 of all stations 12, 34 on the line receive all transmissions relating to data communications made over the line 14, 31. The ID and control waveform is used to physically assert control over the random access media. All receivers demodulate the packet data within the DMT signals. Packet addresses, corresponding to the sending and receiving stations 12 or 34 for a given communication reside within the packet data.

Figure 3:
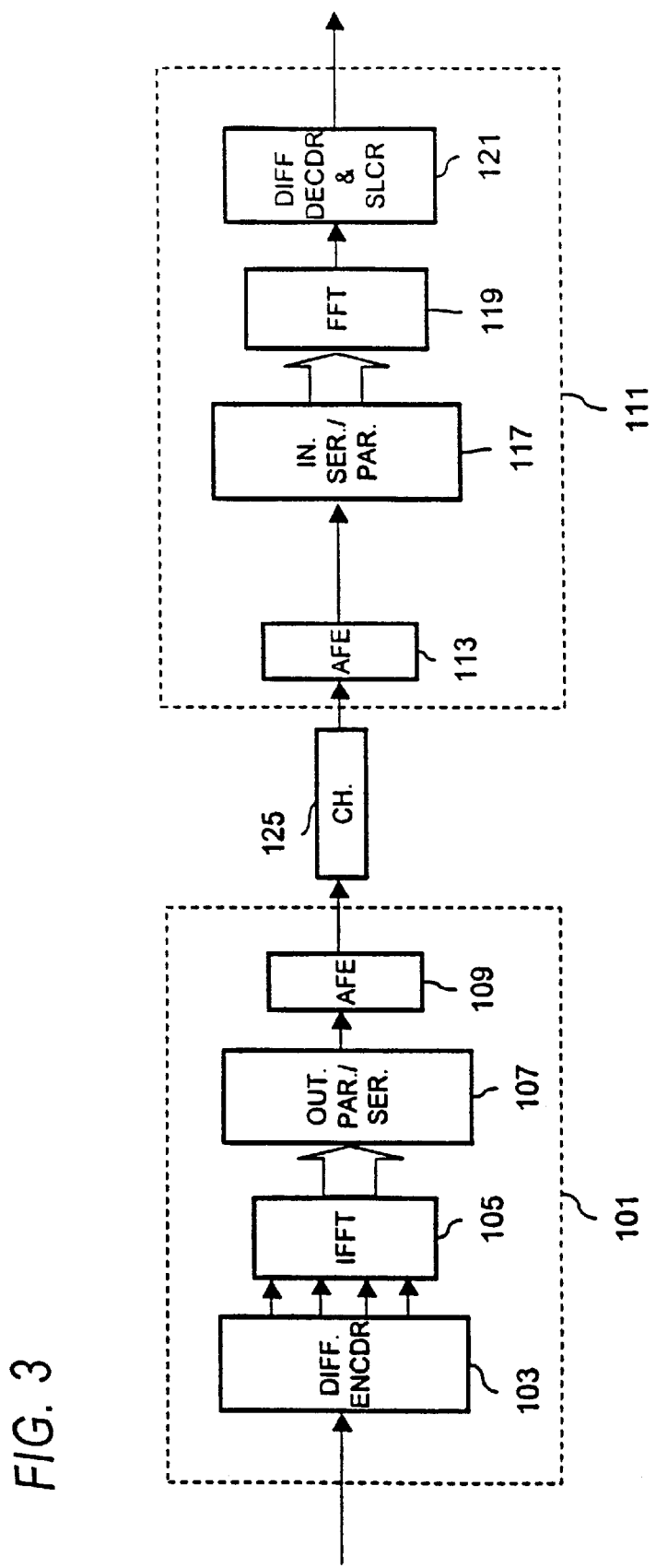
FIG. 3 is a block diagram illustrating a DMT transmitter and receiver for sending and receiving differentially coded DMT signals according to an embodiment of the present invention.

FIG. 3 provides a simplified block diagram of the functional elements of a DMT transmitter and DMT receiver for use in the PHY transceivers 22 of the network 10 (FIG. 2).

The transmitter 101 receives a digital bit stream from a digital source, for example a host central processing unit (CPU) (not shown). The bit stream enters the differential encoder 103, which maps a prescribed number of bits of the bit stream (e.g., 2) to points on the complex plane (i.e., constellation points), in similar fashion to the operating principles of QPSK (quadrature phase shift keying). However, unlike QPSK, the differential encoder 103 encodes the difference between a current constellation point with a previous constellation point. That is, the phase difference between constellation points defines the encoding of the bits.

Figure 4:
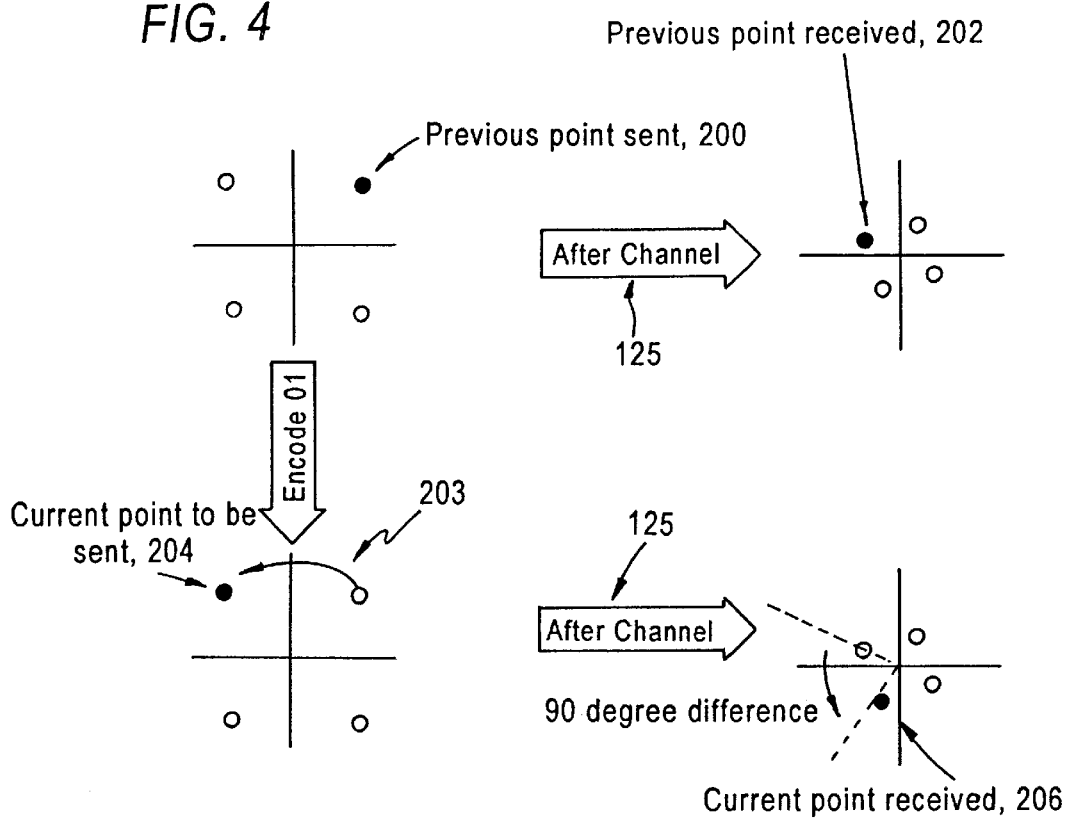
FIG. 4 is a diagram illustrating the differential coding and decoding of bit pairs by the DMT transmitter and receiver of FIG. 3, respectively, according to an embodiment of the present invention.

FIG. 4 is a diagram illustrating in further detail the differential coding of a group of bits according to an embodiment of the present invention. FIG. 4 assumes that the differential encoder 103 maps a group of two bits (i.e., a bit pair) to a four-point Constellation, although higher numbers of bits may be mapped to higher-order constellations (e.g., 3 bits to 8-point, 4 bits to 16-point, 5 bits to 32-point, etc.). The differential coding begins by the generation of a constellation point 200 by the differential encoder 103. The actual position of the constellation point 200 in quadrant Q1, Q2, Q3, or Q4 may be arbitrary, for example during initial transmission of a beginning of a bit stream. As shown in FIG. 4, transmission of the constellation point 200 on the media channel 125 results in attenuation and phase distortion that causes the receiver 111 to detect the Constellation point 200 at location 202.

The differential encoder 103 then performs differential coding by phase-shifting 203 the new constellation point 204 relative to the position of the constellation point 200 and based on the value of the supplied bit pair. For example, a bit-pair value of 00 causes no phase rotation (0 degrees); a bit-pair value of 01 causes a phase rotation of 90 degrees; a bit-pair value of 11 causes a phase rotation of 180 degrees; and a bit-pair value of 10 causes a phase rotation of 270 degrees. As shown in FIG. 4, the 90 degree phase shift 203 of constellation point 204 by the differential encoder 103, relative to the constellation point 200, corresponds to a bit-pair value of 01.

The consecutive transmission of the constellation point 204 on the same DMT tone (i.e., contiguously following the constellation point 200) results in substantially the same attenuation and phase distortion, causing the receiver 111 to detect the constellation point 204 at location 206. However the phase difference between locations 202 and 206 is the same as the phase rotation between the two consecutive transmitted constellation points 200 and 204, enabling the differential decoder 121 within the receiver 111 to accurately decode the bit-pair as 01. Hence, the bit pair is encoded in the phase position of constellation point 204 relative to point 200.

Hence, the use of differential coding, which encodes the information on the amplitude and phase difference between transmitted constellation points, enables the decoding of the transmitted information by the differential decoder 121 without knowledge of the media channel characteristics (e.g., attenuation and phase distortion). In addition, the differential encoding of the information on consecutive symbols effectively updates the constellation rotation, reducing the impact caused by differences in the transmitter clock and the receiver clock.

According to the disclosed embodiment, the differential encoder 103 encodes a bit stream in bit sequences of 2-bits using 256 frequencies (or tones); as a result, a symbol represents 512 bits. Because the encoding scheme focuses on amplitude and phase differences, absolute signal values are not needed for correctly detecting and decoding the received symbols. As such, this technique eliminates the need for a frequency domain equalizer (FEQ) to compensate for amplitude and phase distortion caused by the channel 125.

The output of the differential encoder 103 is a parallel array of "complex numbers." These complex numbers are input in a parallel manner into an Inverse Fast Fourier Transform (IFFT) logic 105. The IFFT logic 105 converts the complex numbers into time-domain waveform samples, which are then supplied to an parallel-to-serial logic 107. The parallel-to-serial logic 107 basically arranges the time-domain waveform samples into a serial stream. A guard band or cyclic-prefix can be prepended to this serial stream before entering the analog front end (AFE) circuit 109 to minimize intersymbol interference (ISI). ISI is an overlapping of waveforms that distorts all symbols involved, potentially corrupting all of them. Among other functions, the AFE circuit 109 performs digital to analog (D/A) conversion and sends the symbol, which includes the differentially encoded signals, over channel 125 to receiver 111.

Figure 1:
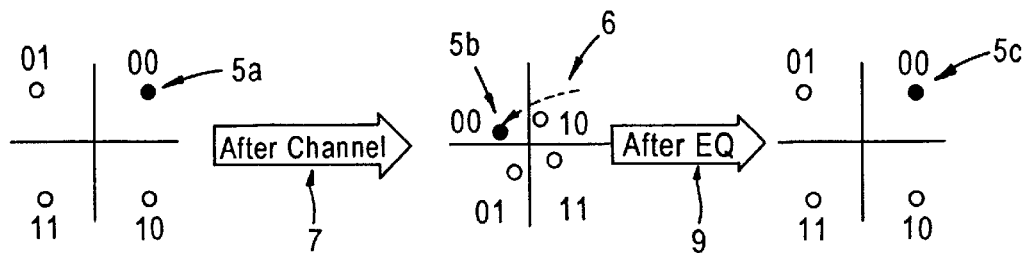
FIG. 1 is a diagram illustrating a conventional coding of bit pairs into a constellation point.

As mentioned previously, the noise within the in-home wiring is quite pronounced. Because of the reflections caused by improper terminations, deep nulls are formed at certain frequencies on the home network. As the symbol propagates through the channel 125, the symbol is attenuated when it arrives at the receiver 111. The receiver 111 of FIG. 1, nonetheless, enables recovery of the transmitted symbol. The receiver 111 receives the symbol using the AFE circuit 113, which is responsible for filtering the analog waveform of the symbol and converting it to a digital equivalent. After processing of the received signal by the AFE 113, the digitized or discrete waveforms are to an input serial-to-parallel logic 117 for conversion to a parallel array of time-domain data. A Fast Fourier Transform logic 119 converts the time domain data back to complex numbers, which are then mapped by the differential decoder and slicer 121 to corresponding bit sequences as described above with respect to FIG. 4 to recover the original data bits. The bits of data derived from all of the tones of one symbol are combined then into a serial bit stream and output by the receiver 111.

For ease of discussion, the following description assumes differential quadrature phase-shift keying type modulation (DQPSK). Because of the relatively short distances involved in communication over in-home wiring, typically all 256 tones provide adequate transport for the DQPSK modulated signals. However, it is within the scope of the invention to vary the modulation and thus the number of bits modulated onto each tone and/or to vary the number of tones utilized in a particular installation or even during a particular communication session. For example, there may be installations were certain tones are unusable, due to noise or poor line characteristics. In another installation, all tones may be usable, but some can carry differential QAM modulation for various numbers of bits up to 15 bits, but other tones provide only adequate transport for the 2-bit DQPSK.

The DMT transmitter and the DMT receiver may be implemented in a number of different ways. For example, they be implemented as specifically engineered chips having logic circuits and other components for performing the functions described above. Alternatively, one or both may be implemented using a general purpose digital signal processor and appropriate programming.

Those skilled in the art will recognize that the present invention admits of a number of modifications, within the spirit and scope of the inventive concepts.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method for encoding data for transmission on a shared network medium in a random-access multipoint network, comprising:

transmitting on the shared network medium a tone modulated based on a corresponding first constellation point having a first position in a complex plane;

encoding a group of bits into a second constellation point having a second position in the complex plane based on the first position and a value of the group of bits; and modulating and transmitting said tone on said shared network medium based on the second constellation point consecutively following the first constellation point.

2. A method as in claim 1, wherein the encoding step includes selectively phase shifting from the first position to the second position in response to the value of the group of bits.

3. A method as in claim 2, wherein the transmitting step includes transmitting the tone modulated according to the first constellation point as one of a plurality of discrete multiple tones representing a first symbol.

4. A method as in claim 3, wherein the modulating and transmitting step includes transmitting the tone modulated according to the second constellation point as one of a plurality of said discrete multiple tones representing a second symbol.

5. A method as in claim 2, wherein the selectively phase shifting step includes setting the second position equal to the first position based on the group of bits having a value equal to zero.

6. A method as in claim 2, wherein the group of bits is a bit pair, the selectively phase shifting step including shifting the first position by one of 90 degrees, 180 degrees, and 270 degrees to obtain the second position of the second constellation point, based on the value of the bit pair.

7. A method as in claim 1, further comprising transmitting the tone on a line comprising in-house telephone wiring.

8. A method as in claim 7, wherein the line is a shared media for random access by a plurality of discrete multi-tone transmitters coupled to the line and at least one discrete multi-tone receiver coupled to the line for reception of symbols from the plurality of transmitters.

9. A method of communicating data over in-house wiring, comprising:

transmitting from a transmitter onto the in-house wiring a first symbol as a plurality of discrete multiple tones, one of said tones modulated according to a first constellation point having a first position in a complex plane;

detecting in a receiver the first constellation point at a first distorted position that is different than the first position in the complex plane;

encoding in the transmitter a group of bits into a second constellation point having a second position in the complex plane based on the first position and a value of the group of bits;

transmitting a second symbol onto the in-house wiring by modulating the one tone according to the second constellation point consecutively following the first constellation point;

detecting in the receiver a second distorted position of the second constellation point in the complex plane; and recovering the group of bits in the receiver by comparing the second distorted position of the second constellation point with the first distorted position.

10. A method as in claim 9, wherein the encoding step includes setting the second position equal to the first position based on the group of bits having a value equal to zero.

11. A method as in claim 10, wherein the the group of bits is a bit pair, the encoding step further including phase shifting the second position relative to the first position by one of 90 degrees, 180 degrees, and 270 degrees based on the value of the bit pair.

12. A discrete multi-tone transmitter for transmitting digital data on an analog line, comprising:
- a differential encoder for encoding the digital data into a new constellation point having a new position in a complex plane based on a value of the digital data and a consecutively preceding constellation point having a corresponding preceding position; and
- a converter for converting the consecutively preceding constellation point and the new constellation point into a time domain-modulated tone signal for transmission on the analog line.

13. A transmitter as in claim 12, further comprising an analog front end for coupling the transmitter to twisted pair telephone wiring.

14. A transmitter as in claim 12, wherein the encoder selectively phase shifts the new constellation point relative to the preceding position to one of a plurality of available positions based on a number of bits in the digital data and the corresponding value.

15. A discrete multi-tone receiver for use on an analog line carrying modulated digital data, comprising:
- a sinusoidal waveform detector, coupled to the line, for detecting cycles of a modulated sinusoid;
- a converter for detecting a first constellation point having a first position in a complex plane and a second constellation point, consecutively following the first constellation point and having a second position in the complex plane; and
- a differential decoder for recovering the digital data based on the second position relative to the first position.

16. A discrete multi-tone receiver as in claim 15, further comprising an analog front end for coupling the receiver to twisted pair telephone wiring.

17. A receiver as in claim 15, wherein the decoder decodes the digital data to a prescribed number of bits and based on one of a plurality of available positions of the second position relative to the first position.

18. A random access multipoint network for transmission of data, comprising:
- a shared network medium; and
- a plurality of network nodes, each comprising:
    (1) a transmitter having a differential encoder for encoding the data into a new constellation point having a new position in a complex plane based on a value of the data and a consecutively preceding constellation point having a corresponding preceding position, and
    (2) a receiver for detecting a first constellation point having a first position in a complex plane and a second constellation point, consecutively following the first constellation point and having a second position in the complex plane, from a modulated tone having encountered at least one of amplitude and phase distortion on the shared network medium, the receiver recovering the data transmitted by the modulated tone based on the second position relative to the first position.

* * * * *